United States Patent
Yamazaki et al.

(10) Patent No.: US 9,046,384 B2
(45) Date of Patent: Jun. 2, 2015

(54) SELF-CALIBRATION METHOD FOR ANGLE DETECTOR, ANGLE DETECTOR, CIRCUMFERENTIAL SCALE CALIBRATION DEVICE, AND ANGLE DETECTOR CALIBRATION DEVICE

(71) Applicants: Harmonic Drive Systems Inc., Tokyo (JP); Satoshi Kiyono, Miyagi (JP)

(72) Inventors: Hiroshi Yamazaki, Nagano (JP); Hiroki Hanaoka, Nagano (JP); Satoshi Kiyono, Miyagi (JP)

(73) Assignees: HARMONIC DRIVE SYSTEMS INC., Tokyo (JP); Satoshi Kiyono, Miyagi (JP)

( * ) Notice: Subject to any disclaimer, the term of this patent is extended or adjusted under 35 U.S.C. 154(b) by 498 days.

(21) Appl. No.: 13/633,071

(22) Filed: Oct. 1, 2012

(65) Prior Publication Data

US 2013/0124128 A1    May 16, 2013

(30) Foreign Application Priority Data

Nov. 14, 2011   (JP) .................................. 2011-249053

(51) Int. Cl.
   *G01C 17/38*    (2006.01)
   *G01D 5/244*    (2006.01)
(52) U.S. Cl.
   CPC .................................. *G01D 5/24452* (2013.01)
(58) Field of Classification Search
   CPC ........................ G01N 2021/213; G01N 21/956

USPC ............................ 702/92, 150, 155, 182–185
See application file for complete search history.

(56) References Cited

U.S. PATENT DOCUMENTS

| | | | |
|---|---|---|---|
| 6,734,968 B1 * | 5/2004 | Wang et al. .................... | 356/369 |
| 2005/0278137 A1 * | 12/2005 | Hammerschmidt et al. .. | 702/151 |
| 2006/0043964 A1 | 3/2006 | Watanabe et al. | |
| 2012/0245876 A1 | 9/2012 | Watanabe | |

FOREIGN PATENT DOCUMENTS

| | | | |
|---|---|---|---|
| JP | 2006-098392 A1 | 4/2006 | |
| JP | 2011-099804 A1 | 5/2011 | |

* cited by examiner

*Primary Examiner* — Edward Raymond

(57) ABSTRACT

In a self-calibration method of an angle detector, an angle interval between first and second scale reader heads are set, so that a single rotation is not equally divided into an integer number of portions by a value of the angle interval and that a plurality of rotations N are equally divided into M equal portions by the value of the angle interval. Readings by the scale reader heads during N rotations of the divided circle are obtained at a pre-set data sampling interval. From differences in readings by these scale reader heads, data of the sequential two-point method relating to an angle scale error of the divided circle are obtained at the data sampling interval. The scale error of the divided circle at the data sampling interval is calculated by synthesizing the data using the fact that an average of the data for the rotations N reaches approximately zero.

4 Claims, 5 Drawing Sheets

US 9,046,384 B2

SELF-CALIBRATION METHOD FOR ANGLE DETECTOR, ANGLE DETECTOR, CIRCUMFERENTIAL SCALE CALIBRATION DEVICE, AND ANGLE DETECTOR CALIBRATION DEVICE

TECHNICAL FIELD

The present invention relates to a self-calibration method for an angle detector that uses a sequential two-point method, to an angle detector that uses the self-calibration method, to a circumferential scale calibration device, and to a calibration device.

BACKGROUND ART

Known methods for calibrating a so-called rotary encoder, which is an angle detector having a scale reader head on the periphery of a rotating divided circle, include methods that use comparison calibration, the equally divided average method, and other methods. Calibration using the equally divided average method is described in Patent Documents 1 and 2.

[Patent Document 1] Japanese Laid-open Patent Publication No. 2006-098392

[Patent Document 2] Japanese Laid-open Patent Publication No. 2011-099804

A sequential two-point method may be used to calibrate a rotary encoder. When the sequential two-point method is used, calibration can be performed using two scale reader heads. Calibration (calculation of scale error) of a rotary encoder by the sequential two-point method requires fewer scale reader heads than other calibration methods. The calculations involved in calibration are also simpler in the sequential two-point method than in other calibration methods.

The sequential two-point method has not been used conventionally as a method for calibrating rotary encoders. The main reason for this is that the error component in the integer interval of equal division of the angle interval between the two scale reader heads is lost from the calibration result.

Specifically, the scale error of a rotary encoder is composed of harmonic components having a single rotation as the fundamental period. The angle interval between two scale reader heads (the angle interval between the scale reading positions of the two scale reader heads) may be the angle interval obtained by dividing one rotation, which is the full range of measurement, into k equal portions, where k is a positive integer. In this case, the sampling theorem imposes a limitation in that only frequency components up to the k/2th frequency component can be handled as the error component of the scale error. There is also the limitation that it is impossible to detect frequency components in the error component of the scale error that are on the order of integer multiples of k. These limitations are obstacles to the use of the sequential two-point method.

It appears that, in theory, this problem can be overcome by increasing the value of k. However, when the value of k is increased, sensitivity to the low-frequency component important to the scale error decreases, and since the accumulation of accidental error increases, the precision of calibration is reduced. Increasing the value of k is therefore not a good solution to the abovementioned problem.

An object of the present invention is to provide a self-calibration method for an angle detector, which makes it possible to precisely calculate the scale error at each angle position in the full range of measurement using a sequential two-point method.

An object of the present invention is to provide an angle detector that is provided with a self-calibration function, wherein self-calibration of the scale error is performed using a self-calibration method, whereby the scale error can be precisely calculated at each angle position in the full range of measurement using a sequential two-point method.

An object of the present invention is to provide a circumferential scale calibration device, whereby a circumferential scale is calibrated using a self-calibration method capable of precisely calculating the scale error at each angle position in the full range of measurement using a sequential two-point method.

An object of the present invention is to provide a calibration device for an angle detector, whereby the scale error of the angle detector is calibrated using a self-calibration method capable of precisely calculating the scale error at each angle position in the full range of measurement using a sequential two-point method.

SUMMARY OF THE INVENTION

The angle detector for which the self-calibration method of the present invention is used has a divided circle provided with a scale at a predetermined interval in the circumferential direction, and scale reader heads for reading the scale at predetermined positions in the circumferential direction of the divided circle. In the self-calibration method of the present invention, the scale error of the divided circle of the angle detector is calculated according to the following procedure. First, a first scale reader head and a second scale reader head are used as the scale reader heads. The angle interval $\alpha°$, where $\alpha°$ is the angle interval between the first scale reader head and the second scale reader head, is set to a value such that a plurality of rotations N are divided into M equal portions, where N is an integer of 2 or greater, and M is an integer of 3 or greater, rather than a single rotation being equally divided into an integer number of portions. Readings by each of the first scale reader head and the second scale reader head during N rotations of the divided circle are acquired at a pre-set data sampling interval. From the difference in readings by the first and second scale reader heads, data of the sequential two-point method relating to the angle scale error of the divided circle are acquired at the data sampling interval. The scale error of the divided circle is calculated at the data sampling interval by synthesizing the data using the fact that the average of the data for the plurality of rotations N reaches approximately zero.

The angle detector of the present invention has a divided circle on which a scale is formed in the circumferential direction, scale reader heads for reading the scale at predetermined positions in the circumferential direction of the divided circle, and a data processing device for computing a scale error of the divided circle by a sequential two-point method. The scale reader heads include a first scale reader head and a second scale reader head. The angle interval $\alpha°$, where $\alpha°$ is the angle interval between the first scale reader head and the second scale reader head, is set to a value such that a plurality of rotations N are divided into M equal portions, where N is an integer of 2 or greater, and M is an integer of 3 or greater, rather than a single rotation being equally divided into an integer number of portions. The data processing device computes the scale error of the divided circle according to the following process. Specifically, the data processing device acquires, at a pre-set data sampling interval, each reading by the first scale reader head and the second scale reader head during N rotations of the divided circle. From the difference in readings by the first and second scale reader heads, data of the sequential two-point method relating to the angle scale error of the divided circle are acquired at the data sampling interval. The scale error of the divided circle is calculated at the data sampling interval by synthesizing the data using the fact that the average of the data for the plurality of rotations N reaches approximately zero.

The circumferential scale calibration device of the present invention is a device for measuring the scale error of a circumferential scale provided at a predetermined interval in the circumferential direction of a divided circle. The circumferential scale calibration device has: a first scale reader head and second scale reader head for reading the scale of a divided circle to be measured; an adjustment mechanism for adjusting the circumferential radius at the position of the divided circle where the scale is read by the first and second scale reader heads, and the angle interval of the reading positions of the first and second scale reader heads; and a data processing device for computing the scale error of the circumferential scale of the divided circle. The data processing device computes the scale error of the divided circle according to the following process. Specifically, the data processing device acquires, at a pre-set data sampling interval, each reading by the first scale reader head and the second scale reader head during N rotations of the divided circle. From the difference in readings by the first and second scale reader heads, data of the sequential two-point method relating to the angle scale error of the divided circle are acquired at the data sampling interval, and the scale error of the divided circle is calculated at the data sampling interval by synthesizing the data using the fact that the average of the data for the plurality of rotations N reaches approximately zero.

The angle detector calibration device of the present invention has: an angle detector for calibration, provided with a calibration divided circle and a calibration scale reader head; an adjustment mechanism for changing the scale reading position in the circumferential direction of the calibration scale reader head with respect to the calibration divided circle; an adapter for coaxially attaching the calibration divided circle to a rotating shaft of an angle detector to be calibrated; and a data processing device for computing the scale error of the divided circle of the angle detector to be calibrated, on the basis of readings of the calibration scale reader head of the angle detector for calibration and readings of the scale reader head of the angle detector that is to be calibrated. The calibration scale reader head being a first scale reader head, and the scale read head of the angle detector to be calibrated being a second scale reader head, the data processing device acquires, at a pre-set data sampling interval, each reading by the first scale reader head and the second scale reader head during N rotations of the divided circle. From the difference in readings by the first and second scale reader heads, the data processing device acquires data of the sequential two-point method relating to the angle scale error of the divided circle, acquired at the data sampling interval. The data processing device then calculates the scale error of the divided circle at the data sampling interval by synthesizing the data using the fact that the average of the data for the plurality of rotations N reaches approximately zero.

Since the sequential two-point method is used in the present invention, only two scale reader heads are needed for calibration, and calibration can be accomplished using fewer scale reader heads than by other calibration methods.

When the sequential two-point method is used, the data interval obtained is limited by the angle interval of the two scale reader heads, and data for computing the scale error cannot be obtained at a smaller interval. In the present invention, data are synthesized using the fact that the average of the data points for N rotations in the sequential two-point method reaches "approximately zero." A calibration curve can thereby be created at the data sampling interval.

The sequential two-point method has a limitation in that the error component in the integer interval of equal division of the angle interval between the two scale reader heads is lost from the calibration result. In the invention of the present application, the first and second scale reader heads are disposed at an angle interval $\alpha$ such that a plurality of rotations N are divided into M equal portions, rather than a single rotation being equally divided into an integer number of portions. The order of frequency components first to be lost is increased to a higher order that has practically no effect on results. The scale error can therefore be reliably computed at each angle position in a single rotation.

In the method of the present invention, the frequency at which loss begins is at order $360/\beta$, where $\beta$ is the angle obtained by dividing the angle interval $\alpha$ into N equal portions. For example, when $\alpha=21°$ and $N=7$, $\beta=3°$, and loss begins at order 120. When $\alpha=19°$ or $23°$, then $N=19$ and $N=23$, $\beta$ is $1°$ for both values of N, and the order at which loss begins is 360.

In the present invention, the expression "approximately zero" means that the average of the data for a plurality of N rotations does not fully reach zero, since high frequencies of the order at which loss begins and of integer multiple orders thereof are included. However, in a common high-precision encoder, the order of frequency components that affect the scale error reaches only about 20, and no practical problems arise from not considering higher orders, i.e., from assuming a value of zero for higher orders. In the method of the present invention, since loss begins at an order significantly higher than 20, the scale error can be computed with sufficiently high precision while assuming a value of approximately zero.

BEST MODE FOR CARRYING OUT THE INVENTION

Embodiments of the present invention are described below with reference to the accompanying drawings.

(Configuration of Self-Calibration Device)

Figure 1:
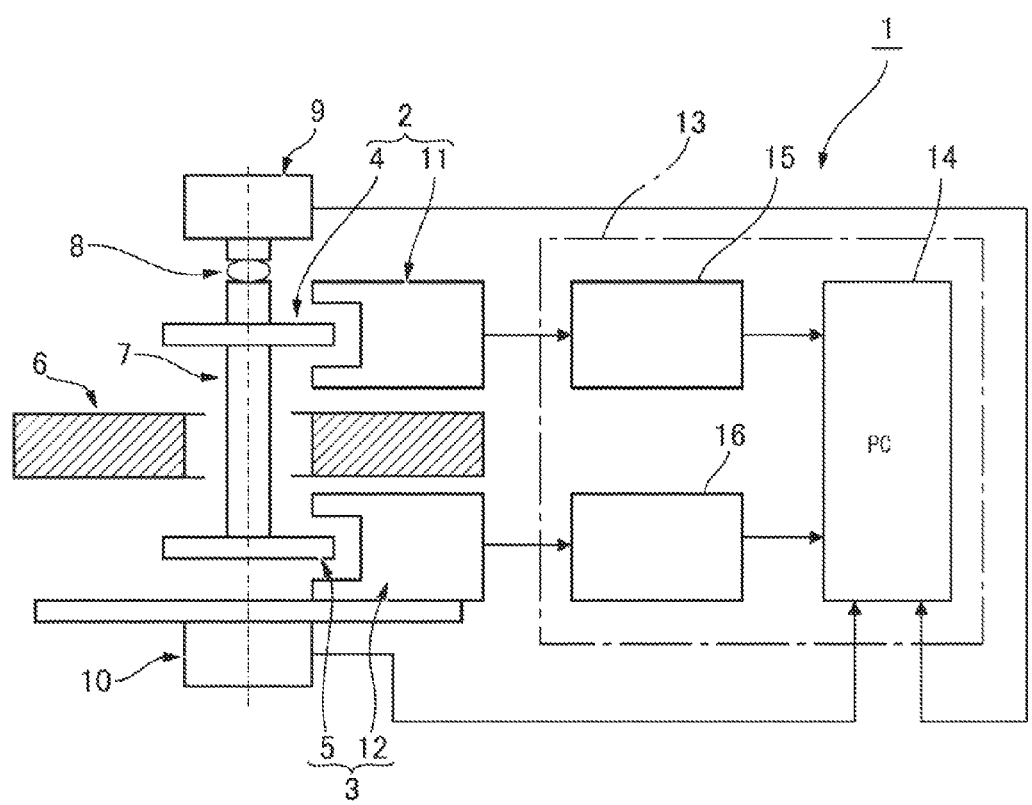
FIG. 1 is a view showing the general configuration of an example of a self-calibration device for a rotary encoder to which the present invention is applied.

First, FIG. 1 is a view showing the general configuration of an example of a self-calibration device for a rotary encoder according to an embodiment of the present invention. The self-calibration device 1 for a rotary encoder (hereinafter, "self-calibration device 1") is provided with two rotary encoders. One rotary encoder is a fixed-side rotary encoder 2, and the other rotary encoder is a phase adjustment-side rotary encoder 3. The fixed-side rotary encoder 2 is provided with a divided circle 4 and a scale reader head 11. The phase adjustment-side rotary encoder 3 is provided with a divided circle 5 and a scale reader head 12.

The divided circle 4 of the rotary encoder 2 and the divided circle 5 of the rotary encoder 3 are each coaxially fixed to a shaft 7 supported by a bearing 6. A motor 9 for continuous rotation of the shaft is coaxially coupled via a coupling 8 to a shaft end part of the shaft 7 to which the divided circle 4 is attached. A motor 10 for phase adjustment is disposed coaxially with respect to the shaft 7 on the side of the shaft end part of the shaft 7 on which the divided circle 5 is attached. The scale reader head 11 of the fixed-side rotary encoder 2 is disposed at a pre-set position in the circumferential direction of the divided circle 4. The scale reader head 12 of the phase adjustment-side rotary encoder 3 is attached at a position separated in the radial direction from the center of rotation of an output shaft of the motor 10 for phase adjustment.

When the motor 10 for phase adjustment rotates, the angle position of the scale reader head 12 of the phase adjustment-side rotary encoder 3 changes with respect to the scale reader head 11 of the fixed-side rotary encoder 2. A desired angle interval can thus be provided between the two scale reader heads 11, 12 (i.e., between the scale reading positions thereof). There may also be provided an adjustment mechanism that is capable of adjusting the position of the scale reader head 12 in the radial direction of the divided circle 5. In this case, the reading position of the scale reader head 12 can be adjusted in both the circumferential direction and the radial direction of the divided circle 5.

Encoder output signals from both the rotary encoders 2, 3 are inputted to a data processing device 13. The data processing device 13 has a computer 14 as a main part thereof. Each of the encoder output signals is inputted to the computer 14 through pulse dividers 15, 16 of the data processing device 13. Motor rotation position information from motor encoders (not shown) housed in the motor 9 and in the phase adjustment motor 10 are fed to the computer 14. The computer 14 controls the driving of the motor 9 for continuous rotation and the motor 10 for phase adjustment, via motor drive circuits not shown in the drawings.

(Self-Calibration Method)

The self-calibration method for the self-calibration device 1 configured as described above will next be described. A data processing program configured according to a sequential two-point method for implementing the self-calibration method is stored in advance in a ROM or the like of the computer 14. Calibration of the divided circles 4, 5 is performed by executing the data processing program. Specifically, the scale error of the divided circles 4, 5 is calculated.

First, the angle position of the reading position of the scale reader head 12 of the phase adjustment-side rotary encoder 3 with respect to the reading position of the scale reader head 11 of the fixed-side rotary encoder 2 is designated as $\alpha°$, N is designated as an integer of 2 or greater, and M is designated as an integer of 3 or greater. The angle interval $\alpha°$ of the scale reader head 12 with respect to the scale reader head 11 is set to a value that divides a plurality of rotations N into M equal portions, rather than a single rotation being equally divided into an integer number of portions. Specifically, the driving of the motor 10 for phase adjustment is controlled, and the reading position of the scale reader head 12 of the phase adjustment-side rotary encoder 3 is adjusted so that such an angle interval $\alpha°$ is achieved.

The motor 9 for continuous rotation is then rotationally driven to form a state in which the divided circle 4 of the fixed-side rotary encoder 2 and the divided circle 5 of the phase adjustment-side rotary encoder 3 rotate at a constant speed. In this state, readings by the scale reader heads 11, 12 during N rotations of the divided circles 4, 5 are inputted to the data processing device 13 at a pre-set data sampling interval.

The data processing device 13 finds a difference in the inputted reading data between the fixed-side rotary encoder 2 and the phase adjustment-side rotary encoder 3. From the difference in readings for the rotary encoders, a polyline group (data) of the sequential two-point method relating to the scale error of the divided circles 4, 5 is acquired at the data sampling interval.

The scale error (calibration value) of the divided circles 4, 5 is calculated at the data sampling interval by synthesizing the polyline group (data) using the fact that the average of the data for a plurality of rotations N reaches approximately zero.

(Operative Example)

Confirmation was obtained of the effect of the data processing method that makes use of the fact that the average of the reading values over the full measurement length (N rotations) reaches approximately zero. Measurement was carried out at phase adjustment angles $\alpha°$ (angle intervals between the scale reading positions of the fixed-side rotary encoder 2 and the phase adjustment-side rotary encoder 3) of 21°, 30°, and 36°.

When the phase adjustment angle was 30°, order 12 (=360°/30°) and the high-frequency component thereof were missing from the measurement results. When the phase adjustment angle was 36°, order 10 (=360°/36°) and the high-frequency component thereof were missing from the measurement results. In the method of the present invention, however, the phase adjustment angle $\alpha$ was set to 21°, and seven rotations (N=7) were treated as one period. In this case, it was confirmed that there was essentially no loss of frequency components such as occurs when two-pattern phase adjustment angles of 30° and 36° are used to equally divide a single rotation into an integer number of portions as described above.

The procedure for data processing by the sequential two-point method in this operative example is described below. The trigger during data sampling is based on the rotation angle of the fixed-side rotary encoder 2.

(1) A setting is made to a phase adjustment angle $\alpha$ equal to 0° (the reading position of the fixed-side rotary encoder 2 is set to 0°, and the reading position of the phase adjustment-side rotary encoder 3 is set to 0°) as the initial phase state, and the rotation angles of the two rotary encoders 2, 3 are read for seven continuous rotations from this state.

(2) A setting is then made to a phase shift state where the phase adjustment angle $\alpha$ is equal to 21° (the reading position of the fixed-side rotary encoder 2 is set to 0°, and the reading position of the phase adjustment-side rotary encoder 3 is set to 21°), and the rotation angles of the two rotary encoders 2, 3 are read for seven continuous rotations from this state.

(3) The difference after phase shifting with respect to the initial phase state is computed for the two sets of readings of the phase adjustment-side rotary encoder 3 acquired in procedures (1) and (2).

(4) The difference computed in procedure (3) is extracted at 21° intervals, and the accumulated value thereof is found. A 120 (=360×7÷21)-point polyline is thereby obtained. Between 0° and 21°, the same processing is performed for different angles of the initial point, and a number of polylines equal to (21°/Sampling period) are obtained.

(5) The average value of the readings is found for the polylines obtained in procedure (4), and the polylines are offset to bring the average value to zero. The (21°/Sampling period) polylines are thereby associated with each other.

(6) The polylines for seven rotations found in procedure (5) are then isolated for each rotation, and using the remainder from subtracting (n−1)×360, the angle positions subsequent to the $n^{th}$ rotation are rearranged to angle positions of 0 to 360°, and a calibration curve for the phase adjustment-side rotary encoder 3 is obtained.

(7) The data obtained in procedure (5) are subtracted from the data obtained in procedure (1), the data for seven rotations are isolated for each rotation, and using the remainder from subtracting (n−1)×360, the angle positions subsequent to the $n^{th}$ rotation are rearranged to angle positions of 0 to 360°, and a calibration curve for the fixed-side rotary encoder 2 is obtained.

Figure 2:
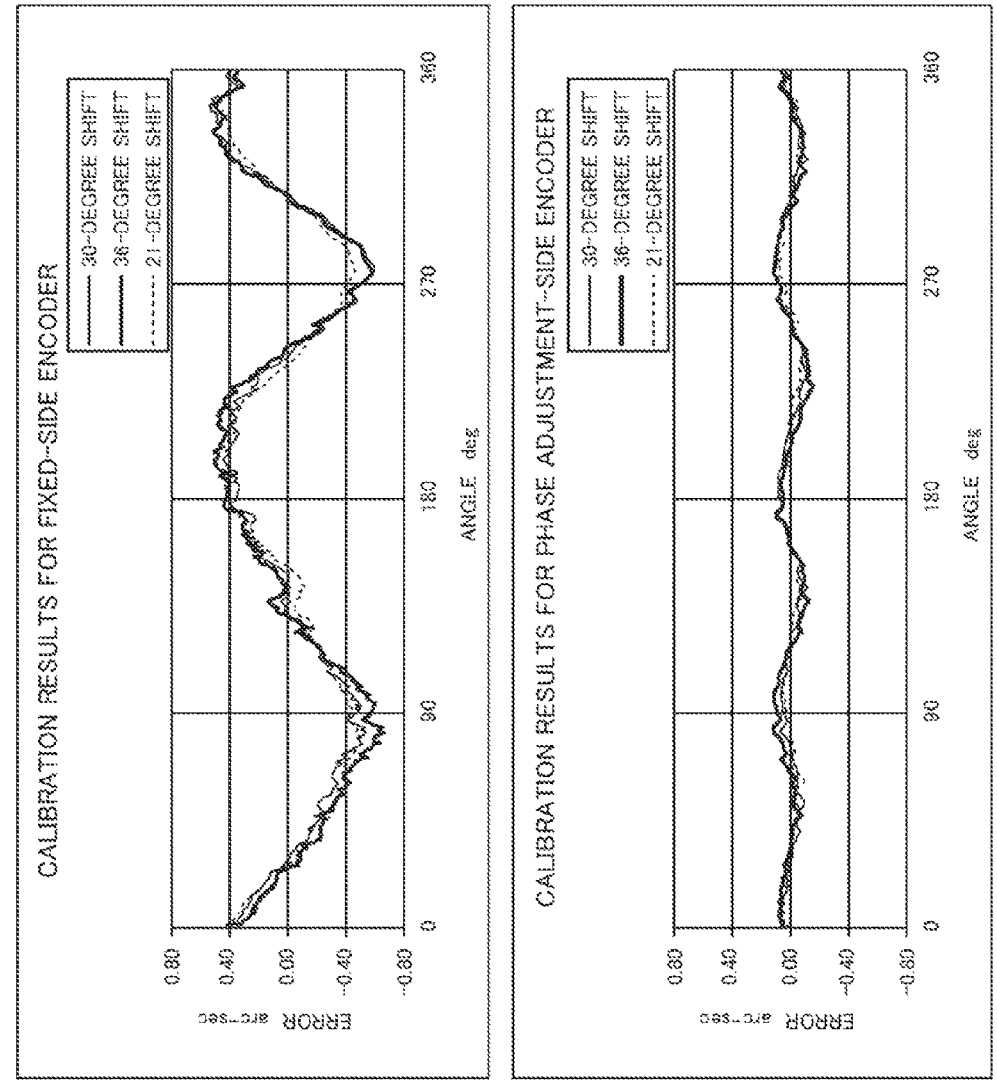
FIG. 2 is a graph showing the results of self-calibration of the rotary encoder.

FIG. 2 shows the results of data processing by procedures (1) through (7) above for a case in which there are three phase adjustment angles (30°, 36°, and 21°). It can be confirmed from the graph in FIG. 2 that the calibration values for the fixed-side rotary encoder 2 and the phase adjustment-side rotary encoder 3 are closely matched.

Figure 3:
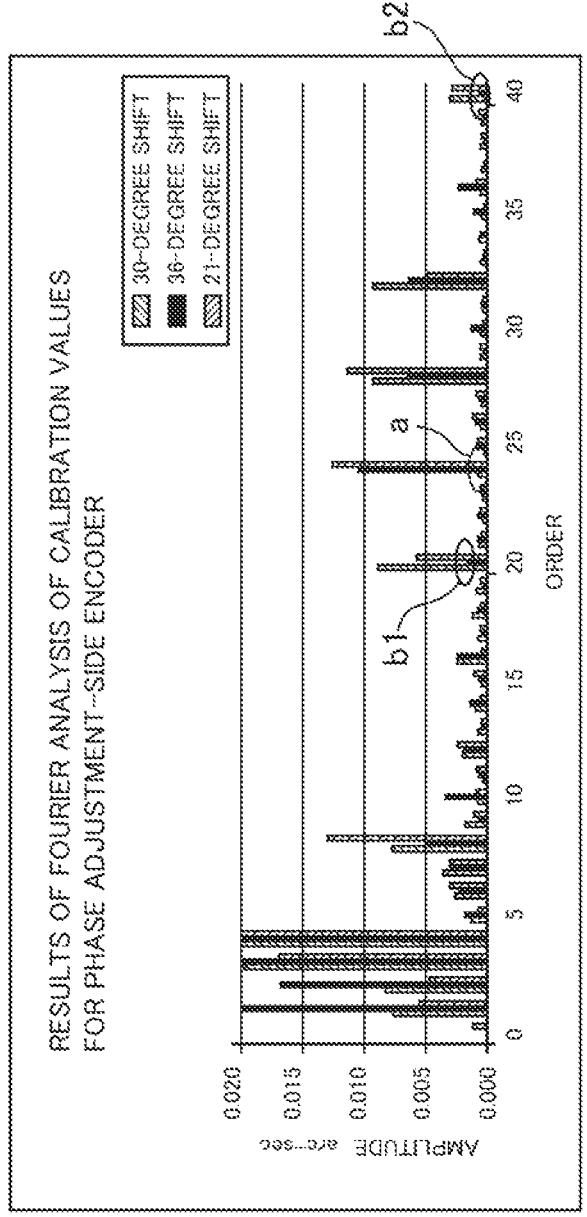
FIG. 3 is a graph showing the results of Fourier analysis of the self-calibration values for the rotary encoder.

The calibration results for each phase adjustment angle were also subjected to Fourier analysis. FIG. 3 shows the results of Fourier analysis for the phase adjustment-side rotary encoder 3. As is apparent from FIG. 3, a frequency component is missing in order 24 (portion 'a' in FIG. 3) when the phase adjustment angle is 30°. When the phase adjustment angle is 36°, frequency components are missing in order 20 (portion b1 in FIG. 3), and order 40 (portion b2 in FIG. 3).

In contrast, when the phase adjustment angle is 21° according to the present invention, loss of frequency components cannot be confirmed even in higher orders. Consequently, it is possible to confirm the efficacy of a method in which a plurality of rotations is considered to be a single period and the obtained data are processed by the sequential two-point method.

As described above, the present invention provides a data processing method which increases the spatial frequency that can be measured. Specifically, the present invention enables data to be sampled at an interval smaller than the phase adjustment angle.

A plurality of measurement results in which the phase of the initial point is offset by an amount equal to the data sampling interval can also be obtained for a discrete angle error processed by the sequential two-point method. The results can be associated with each other using the fact that the average of the values over the full measurement length reaches approximately zero.

Furthermore, the error of a rotary encoder is composed of harmonic components having a single rotation as the fundamental period thereof. Rather than arranging the two scale reader heads at an angle interval that equal divides a single rotation into an integer number of portions, the angle interval, i.e., the phase adjustment angle, of the scale reader heads is set so that the same point is detected for the first time in two or more rotations. Consequently, measurement can be performed with no loss of frequency components.

(Rotary Encoder Provided with Self-Calibration Function)

A rotary encoder provided with a self-calibration function can be realized by equipping a rotary encoder with the self-calibration device 1. For example, when the self-calibration device 1 constituted as shown in FIG. 1 is used without modification thereto, the fixed-side rotary encoder 2 becomes the rotary encoder to be calibrated.

A configuration may be adopted in which only the second scale reader head 12 is provided at the divided circle 4 of the rotary encoder 2, instead of providing the phase adjustment encoder 3 in FIG. 1. In this configuration, the second scale reader head 12 is phase-adjusted so as to have a predetermined angle interval α° with respect to the scale reader head 11.

(Circumferential Scale Calibration Device)

Through the present invention, a circumferential scale calibration device can be provided for measuring the scale error of a circumferential scale provided at a predetermined angle interval in the circumferential direction of a divided circle.

Figure 4:
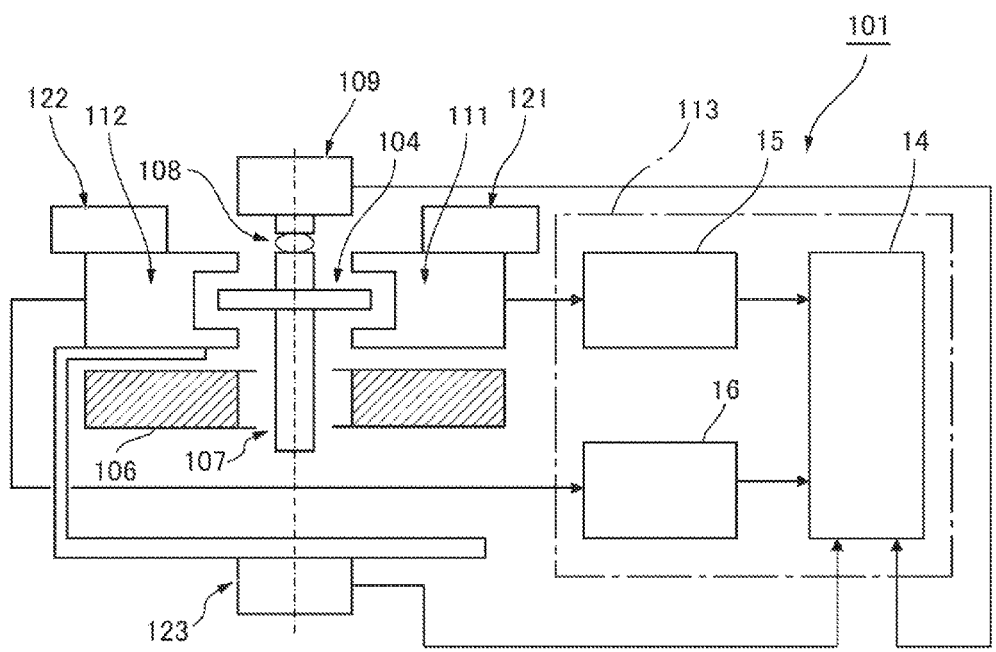
FIG. 4 is a view showing the general configuration of an example of a divided circle calibration device to which the present invention is applied.

FIG. 4 is a view showing the general configuration of a circumferential scale calibration device to which the present invention is applied. The circumferential scale calibration device 101 has a first scale reader head 111 and a second scale reader head 112 for reading the scale of a divided circle 104 that is to be measured. The divided circle 104 to be measured is coaxially attached to a shaft 107 supported by a bearing 106. A motor 109 for continuous rotation of the shaft is coaxially coupled to the shaft 107 via a coupling 108.

The circumferential radius at the position of the divided circle 104 where the scale is read by the first scale reader head 111 can be adjusted by a first adjustment mechanism 121. The circumferential radius at the position of the divided circle 104 where the scale is read by the second scale reader head 112 can be adjusted by a second adjustment mechanism 122. The angle interval of the position of the divided circle 104 where the scale is read by the first and second scale reader heads 111, 112 can be adjusted by a third adjustment mechanism 123. For example, the scale reading position of the first scale reader head 111 is a fixed position in the circumferential direction about the shaft 107. The scale reading position of the second scale reader head 112 in the circumferential direction is adjusted by the third adjustment mechanism 123 (motor for phase adjustment).

Readings by the first and second scale reader heads 111, 112 are inputted to a data processing device 113. The data processing device 113 has the same configuration as the data processing device 13 of FIG. 1, and the corresponding parts thereof are labeled with the same reference symbols as in FIG. 1. The data processing device 113 computes the scale error of the circumferential scale of the divided circle 104 by a calibration method using the sequential two-point method.

(Portable Rotary Encoder Calibration Device)

Figure 5:
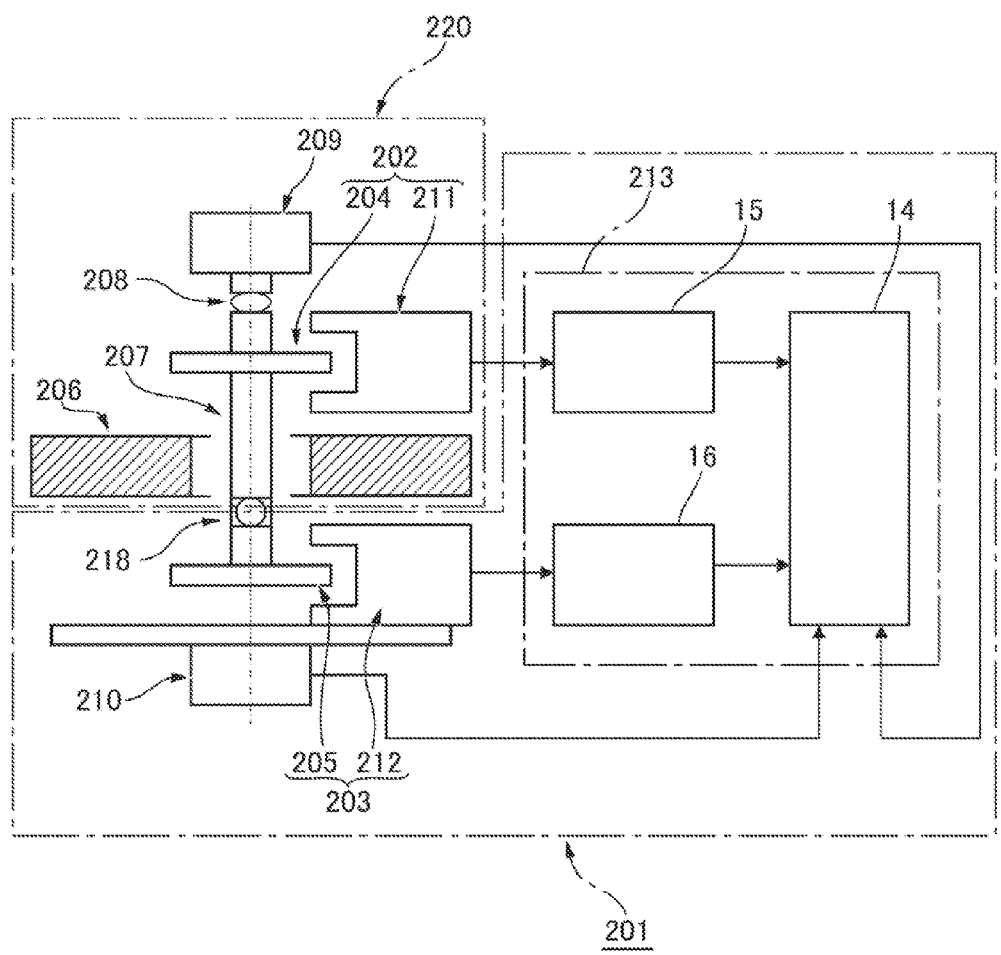
FIG. 5 is the general configuration of a calibration device for a rotary encoder to which the present invention is applied.

The present invention makes it possible to provide a rotary encoder calibration device; in particular, a portable calibration device. FIG. 5 is a view showing the general configuration of a calibration device for a rotary encoder.

The calibration device 201 for a rotary encoder comprises a calibration rotary encoder 203 provided with a calibration divided circle 205 and a calibration scale reader head 212. The scale reading position of the calibration scale reader head 212 in the circumferential direction with respect to the calibration divided circle 205 can be adjusted by an adjustment mechanism 210 that is provided with a motor. The calibration divided circle 205 is coaxially attached, via an adapter 218, to a rotating shaft 207 of an angle detector 202 that is to be calibrated. The rotating shaft 207 is supported by a bearing 206 so as to be able to rotate.

Readings by the calibration scale reader head 212 of the calibration rotary encoder 203 and readings by a scale reader head 211 of the rotary encoder 202 to be calibrated are inputted to a data processing device 213. On the basis of the inputted readings, the data processing device 213 computes the scale error of a divided circle 204 of the rotary encoder 202 to be calibrated. The data processing device 213 has the same configuration as the data processing device 13 of FIG. 1, and the corresponding parts thereof are labeled with the same reference symbols as in FIG. 1. The data processing device 213 computes the scale error of the circumferential scale of the divided circle 204 by a calibration method using the sequential two-point method.

In a device 220 on the side where the rotary encoder 202 to be calibrated is located, the divided circle 204 of the rotary encoder 202 is coaxially attached to the rotating shaft 207. The rotating shaft 207 is coupled to a motor 209 via a coupling 208 or the like.

Other Embodiments

In the present invention, a so-called opposing reading method can be employed in which two scale reader heads are disposed at an angle interval of 180°, and the angle reading values of the pair of scale reader heads are averaged. It is thereby possible to eliminate the effects of oscillations of the divided circle in the radial direction of the rotating shaft, as well as the effects of eccentricity of the divided circle with respect to the rotating shaft.

For example, in the self-calibration device 1 of FIG. 1, two scale reader heads 11 are disposed at an angle interval of 180°, and two scale reader heads 12 are disposed at an angle interval of 180°. In the circumferential scale calibration device 101 of FIG. 4, two scale reader heads 111 are disposed at an angle interval of 180°, and two scale reader heads 112 are disposed at an angle interval of 180°. In the calibration device 201 of FIG. 5, two scale reader heads 212 are disposed at an angle interval of 180°.

This patent application claims priority to Japanese Patent Application Ser. No. 2011-249053, the contents of which are incorporated herein by reference in their entireties.

The invention claimed is:

1. A self-calibration method of an angle detector, wherein the angle detector has a divided circle provided with a scale at a predetermined interval in a circumferential direction thereof, and first and second scale reader heads for reading the scale at predetermined positions in the circumferential direction of the divided circle, comprising the steps of:
    positioning the first scale reader head and the second scale reader head at an angle interval $\alpha°$ with respect to each other, in which a value of the angle interval $\alpha°$ is set such that a single rotation is not equally divided into an integer number of portions by the value and that a plurality of rotations N are equally divided into M equal portions by the value, where N is an integer equal to or greater than 2, and M is an integer equal to or greater than 3;
    acquiring readings by each of the first scale reader head and the second scale reader head during N rotations of the divided circle at a pre-set data sampling interval;
    calculating differences in readings by the first and second scale reader heads;
    from the calculated differences, acquiring data of the sequential two-point method relating to an angle scale error of the divided circle at the data sampling interval; and
    calculating the scale error of the divided circle at the data sampling interval by synthesizing the data using the fact that an average of the data for the plurality of rotations N reaches approximately zero.

2. An angle detector comprising:
    a divided circle on which a scale is formed in a circumferential direction thereof;
    first and second scale reader heads for reading the scale at predetermined positions in the circumferential direction of the divided circle; and
    a data processing device for computing a scale error of the divided circle by a sequential two-point method, wherein
    an angle interval $\alpha°$ between the first scale reader head and the second scale reader head, is set such that a single rotation is not equally divided into an integer number of portions by a value of the angle interval $\alpha°$ and that a plurality of rotations N are equally divided into M equal portions by the value of the angle interval $\alpha°$, where N is an integer equal to or greater than 2, and M is an integer equal to or greater than 3, and wherein
    the data processing device acquires, at a pre-set data sampling interval, each reading by the first scale reader head and the second scale reader head during N rotations of the divided circle,
    from the difference in readings by the first and second scale reader heads, the data processing device acquires data of the sequential two-point method relating to the angle scale error of the divided circle at the data sampling interval, and
    the data processing device calculates the scale error of the divided circle at the data sampling interval by synthesizing the data using the fact that the average of the data for the plurality of rotations N reaches approximately zero.

3. A circumferential scale calibration device for measuring a scale error of a circumferential scale provided at a predetermined interval in a circumferential direction of a divided circle comprising:
    first and second reader heads for reading the scale of a divided circle to be measured;
    an adjustment mechanism for adjusting a circumferential radius at a position of the divided circle where the scale is read by the first and second scale reader heads, and an angle interval of the reading positions of the first and second scale reader heads, wherein the adjustment mechanism adjusts the angle interval such that a single rotation is not equally divided into an integer number of portions by a value of the angle interval and that a plurality of rotations N are equally divided into M equal portions by the value of the angle interval, where N is an integer equal to or greater than 2, and M is an integer equal to or greater than 3; and
    a data processing device for computing a scale error of the circumferential scale of the divided circle, which acquires, at a pre-set data sampling interval, each reading by the first scale reader head and the second scale reader head during N rotations of the divided circle; from the difference in readings by the first and second scale reader heads, acquires data of the sequential two-point method relating to the angle scale error of the divided circle at the data sampling interval; and calculates the scale error of the divided circle at the data sampling interval by synthesizing the data using the fact that the average of the data for the plurality of rotations N reaches approximately zero.

4. An angle detector calibration device comprising:
    an angle detector for calibration, provided with a calibration divided circle and a calibration scale reader head;
    an adjustment mechanism for changing a scale reading position in the circumferential direction of the calibration scale reader head with respect to the calibration divided circle;
    an adapter for coaxially attaching the calibration divided circle to a rotating shaft of an angle detector to be calibrated; and a data processing device for computing the scale error of the divided circle of the angle detector to be calibrated, on the basis of readings of the calibration scale reader head of the angle detector for calibration and readings of the scale reader head of the angle detector that is to be calibrated, wherein the calibration scale reader head is a first scale reader head, and the scale read head of the angle detector to be calibrated is a second scale reader head, wherein the adjustment mechanism adjusts an angle interval of the reading positions of the first and second scale reader heads such that a single rotation is not equally divided into an integer number of portions by a value of the angle interval and that a plurality of rotations N are equally divided into M equal portions by the value of the angle interval, where N is an integer equal to or greater than 2, and M is an integer equal to or greater than 3, and wherein the data processing device acquires, at a pre-set data sampling interval, each reading by the first scale reader head and the second scale reader head during N rotations of the divided circle; from the difference in readings by the first and second scale reader heads, the data processing device acquires data of the sequential two-point method relating to the angle scale error of the divided circle, at the data sampling interval; and the data processing device then calculates the scale error of the divided circle at the data sampling interval by synthesizing the data using the fact that the average of the data for the plurality of rotations N reaches approximately zero.

* * * * *